US011281670B2

(12) United States Patent
Baby et al.

(10) Patent No.: US 11,281,670 B2
(45) Date of Patent: Mar. 22, 2022

(54) HIGH-PERFORMANCE IMPLEMENTATION OF SHARING OF READ-ONLY DATA IN A MULTI-TENANT ENVIRONMENT

(71) Applicant: Oracle International Corporation, Redwood Shores, CA (US)

(72) Inventors: Thomas Baby, Maple Valley, WA (US); Giridhar Ravipati, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 16/370,980

(22) Filed: Mar. 30, 2019

(65) Prior Publication Data

US 2020/0311086 A1    Oct. 1, 2020

(51) Int. Cl.
*G06F 16/00* (2019.01)
*G06F 16/2455* (2019.01)
*G06F 12/0813* (2016.01)
*G06F 16/25* (2019.01)

(52) U.S. Cl.
CPC .... *G06F 16/24552* (2019.01); *G06F 12/0813* (2013.01); *G06F 16/256* (2019.01); *G06F 2212/163* (2013.01); *G06F 2212/465* (2013.01)

(58) Field of Classification Search
CPC ............. G06F 16/24552; G06F 16/256; G06F 16/258; G06F 2212/163; G06F 2212/465
See application file for complete search history.

(56) References Cited

U.S. PATENT DOCUMENTS

| | | | |
|---|---|---|---|
| 6,272,503 B1* | 8/2001 | Bridge, Jr | ........... G06F 16/9017 |
| 6,804,671 B1 | 10/2004 | Loaiza et al. | |
| 7,493,311 B1 | 2/2009 | Cutsinger | |
| 7,822,717 B2 | 10/2010 | Kappor et al. | |
| 8,364,648 B1 | 1/2013 | Sim-Tang | |
| 10,146,702 B2 | 12/2018 | Wu et al. | |

(Continued)

FOREIGN PATENT DOCUMENTS

WO    WO 2014/052851 A1    4/2014

OTHER PUBLICATIONS

Krulikov, U.S. Appl. No. 15/331,525, filed Oct. 21, 2016, Interview Summary, dated Aug. 28, 2019.

(Continued)

*Primary Examiner* — Dinku W Gebresenbet
(74) *Attorney, Agent, or Firm* — Hickman Becker Bingham Ledesma LLP (57) ABSTRACT

A container is a collection of schemas, objects, and related structures in a multitenant container database (CDB) that appears logically to an application as a separate database. Within a CDB, each container has a unique ID and name. The root database and every PDB is considered a container. PDBs isolate data and operations so that from the perspective of a user or application, each PDB appears as if it were a traditional non-CDB. A database management system that manages a container database is a container database management system (CDBMS). Data and metadata in the root database may include common schemas that make the functionality that users will often use available CDB-wide. To execute a query accessing a common schema, the common schemas may be accessed by sessions of a PDB without switching database contexts.

18 Claims, 6 Drawing Sheets

(56) References Cited

U.S. PATENT DOCUMENTS

| | | | |
|---|---|---|---|
| 2002/0112022 A1 | 8/2002 | Kazar et al. | |
| 2003/0061537 A1 | 3/2003 | Cha et al. | |
| 2004/0267809 A1 | 12/2004 | East et al. | |
| 2005/0038831 A1 | 2/2005 | Souder et al. | |
| 2007/0100912 A1 | 5/2007 | Pareek et al. | |
| 2007/0118527 A1 | 5/2007 | Winje | |
| 2007/0244918 A1 | 10/2007 | Lee et al. | |
| 2009/0063559 A1* | 3/2009 | Rhodes | G06F 16/258 |
| 2010/0318570 A1 | 12/2010 | Narasinghanallur et al. | |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0307450 A1 | 12/2011 | Hahn et al. | |
| 2012/0109926 A1 | 5/2012 | Noik et al. | |
| 2013/0085742 A1 | 4/2013 | Barker et al. | |
| 2013/0117237 A1 | 5/2013 | Thomsen et al. | |
| 2013/0212068 A1 | 8/2013 | Talius et al. | |
| 2014/0095452 A1 | 4/2014 | Lee et al. | |
| 2014/0095530 A1* | 4/2014 | Lee | G06F 3/065 707/769 |
| 2014/0095546 A1* | 4/2014 | Kruglikov | G06F 13/1663 707/784 |
| 2014/0164331 A1 | 6/2014 | Li et al. | |
| 2014/0337336 A1 | 11/2014 | Carlson | |
| 2015/0254240 A1 | 9/2015 | Li et al. | |
| 2017/0116282 A1* | 4/2017 | Jain | G06F 16/214 |
| 2017/0116334 A1* | 4/2017 | Kruglikov | G06F 16/951 |

OTHER PUBLICATIONS

Kruglikov, U.S. Appl. No. 15/331,525, filed Oct. 21, 2016, Office Action, dated Jul. 25, 2019.

U.S. Appl. No. 13/631,815, filed Sep. 28, 2012, Office Action, dated Nov. 6, 2014.

U.S. Appl. No. 13/631,815, filed Sep. 28, 2012, Notice of Allowance, dated Aug. 20, 2015.

U.S. Appl. No. 13/631,815, filed Sep. 8, 2012, Notice of Allowance, dated Apr. 3, 2015.

U.S. Appl. No. 13/631,815, filed Sep. 28, 2012, Office Action, dated Dec. 23, 2013.

U.S. Appl. No. 13/631,815, filed Sep. 28, 2012, Office Action, dated May 29, 2014.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Base, Multitenant: Create and Configure a Pluggable Database (PDB) In Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

* cited by examiner

AFN = "Absolute File Number"
RFN = "Relative File Number"
RDBA = "Relative Number : Data Block Address (e.g. offset)"

RFN MAPPING 206

| RFN | DB ID | AFN |
|---|---|---|
| 1 | R0 | 0 |
| 12 | R0 | 1 |
| 0 | P0 | 2 |
| 1 | P0 | 3 |
| 0 | P1 | 4 |
| 1 | P1 | 5 |
| 0 | P2 | 6 |
| 1 | P2 | 7 |
| 3 | P0 | 8 |
| 7 | P1 | 9 |
| 5 | P2 | 10 |
| ... | | |

AFN MAPPING 205

| AFN | FILE |
|---|---|
| 0 | CDB.DB |
| 1 | CSCH.DB |
| 2 | PDB230A.DB |
| 3 | PDB230B.DB |
| 4 | PDB240A.DB |
| 5 | PDB240B.DB |
| 6 | PDB250A.DB |
| 7 | PDB250B.DB |
| 8 | CSCH.DB |
| 9 | CSCH.DB |
| 10 | CSCH.DB |
| ... | |

DB OBJECT FILE MAPPING 208

| TABLE | RDBA |
|---|---|
| ... | ... |
| USERS | 1:0 |
| ... | ... |
| ADDRESS | 12:0 |

DB OBJECT FILE MAPPING 234

| TABLE | RDBA |
|---|---|
| EMP | 0:0 |
| DEPT | 0:3000 |
| POSITION | 1:0 |
| LOCATION | 1:1000 |
| ... | ... |
| ADDRESS | 3:0 |

DB OBJECT FILE MAPPING 244

| TABLE | RDBA |
|---|---|
| PRODUCT | 0:0 |
| SALES | 0:4000 |
| CUSTOMERS | 1:0 |
| ORDERS | 1:10000 |
| ... | ... |
| ADDRESS | 7:0 |

DB OBJECT FILE MAPPING 254

| TABLE | RDBA |
|---|---|
| USER | 0:0 |
| TICKETS | 0:5000 |
| DEVICE | 1:0 |
| APP | 1:500 |
| ... | ... |
| ADDRESS | 5:0 |

FIG. 4

HIGH-PERFORMANCE IMPLEMENTATION OF SHARING OF READ-ONLY DATA IN A MULTI-TENANT ENVIRONMENT

CROSS-REFERENCE TO RELATED APPLICATIONS

This application is related to U.S. application Ser. No. 15/331,525, filed Oct. 21, 2016, entitled "Application Containers in Container Databases"; U.S. Pat. No. 6,272,503 B1, filed May 30, 1997, entitled "Tablespace-Relative Database Pointers"; U.S. Pat. No. 9,239,763 B2, filed Sep. 28, 2012, entitled "Container Database"; the entire contents for each of which is hereby incorporated by reference as if fully set forth herein.

FIELD OF THE INVENTION

The present invention generally relates to techniques for accessing common schemas in multi-tenant database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A container is a collection of schemas, objects, and related structures in a multitenant container database (CDB) that appears logically to an application as a separate database. The root database and every pluggable database (PDB) is considered a container within a CDB. Every CDB has one root database and multiple PDBs. The root database stores data and metadata shared among all PDBs within the CDB.

Since root databases store data and metadata that is shared among all the PDBs of the CDB, the information stored by the root database is typically installed by the database software provider and includes objects/items such as common code/functions, tables of diagnostic information, tables of metrics, definitions of common users and roles, and so forth.

Data and metadata in the root database may include common schemas that make the functionality that users will often use available CDB-wide. The term common schema is used to not only refer to metadata describing a schema (e.g. a table, table columns and column types) but database data stored as an instance of that schema (e.g. table data that includes the column values for the columns). Database data stored as an instance of the schema may be referred to herein as common schemas. For example, common schemas may include a world-wide address schema and database data for that schema.

One way to access a common schema in a root database is to access the common schema through data-linked objects. Database objects that are data-linked have both the metadata defining the database object and the data itself stored in the root database. If a user is connected to a PDB of the root database an attempt to access a data-linked object causes the DBMS to database context switch and to use the data dictionary of the root database, rather than that of the PDB to which the session was established.

One drawback to the use of data-linked objects is that a database context switch from a PDB to the root database is expensive, particularly when fetching multiple data-linked data objects. When the database system receives a query request to fetch multiple data objects, a database context switch needs to be done for every data object, which is a very time-consuming procedure. The database context switch is even more expensive when a data-linked object has a high number of rows. The number of database context switches is proportional to the number of rows fetched when accessing the data-linked object.

Accordingly, there is a need for a way to avoid a database context switch and to increase the speed of accessing common schemas.

DETAILED DESCRIPTION

In the following description, for the purpose of explanation, numerous specific details are set forth in order to provide a thorough understanding of the present invention. It will be apparent, however, that the present invention may be practiced without these specific details. In other instances, readily understood structures and devices are shown in block diagram form in order to avoid unnecessarily obscuring the present invention.

The detailed description is laid out in the following sections:
    General Overview
    Database Systems
        Multitenant Architecture
        Database Dictionary and Database Data Storage
    General Operating Environment
        Container Database
        Database Files
    Mapping to Database Files within a Database
    Mapping to Database Files that Store a Common Schema
    Database Contexts and Switching
    Execution Plans Show no Content Switching
    Application Root
    Software Overview
    Cloud Computing
    Hardware Overview
General Overview Described herein are approaches to implementing common schemas within a container database. To execute a query accessing a common schema, the common schemas may be accessed by sessions of a PDB without switching database contexts.

Database Systems

A database management system (DBMS) manages a database. A DBMS may comprise one or more database servers. A database comprises database data and a database dictionary that is stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language (DDL) commands are issued to a database server to create or configure database objects, such as tables, views, or complex data types. SQL/XML is an extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Multitenant Architecture

A container is a collection of schemas, objects, and related structures in a multitenant container database (CDB) that appears logically to an application as a separate database. Within a CDB, each container has a unique ID and name. The root database and every PDB is considered a container. PDBs isolate data and operations so that from the perspective of a user or application, each PDB appears as if it were a traditional non-CDB. Each PDB is defined by its own separate database dictionary. A database dictionary comprises metadata that defines database objects contained in a database. Database objects include tables, table columns, and tablespaces.

The root container, also called "the root", is a collection of schemas, schema objects, and non-schema objects to which all PDBs within a particular CDB belong. Every CDB has a root which stores the system metadata required to manage all PDBs within the CDB. In some implementations, the root does not store "user" data, but instead stores shared data that is common across the PDBs of the CDB, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared resources shared among PDBs are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

Database Dictionary and Database Data Storage

The database dictionary contains metadata that defines database objects physically or logically contained in the database. Database objects include tables, columns, data types, users, user privileges, and storage structures used for storing database object data. The database dictionary is modified according to DDL commands issued to add, modify, or delete database objects.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. ava file) and the compiled version of the class (i.e. .class file). For further information regarding the database dictionary and database data object storage see "Container Database", by Jaebock Lee, Kumar Rajamani, Giridhar Ravipati, Andre Kruglikov, Sanket Jain, Chandrasekharan Iyer, Philip Yam, and Yunrui Li, U.S. Pat. No. 9,239,763 B2, filed on Sep. 28, 2012, which is hereby incorporated by reference for all purposes as though fully stated herein.

General Operating Environment

Figure 1:
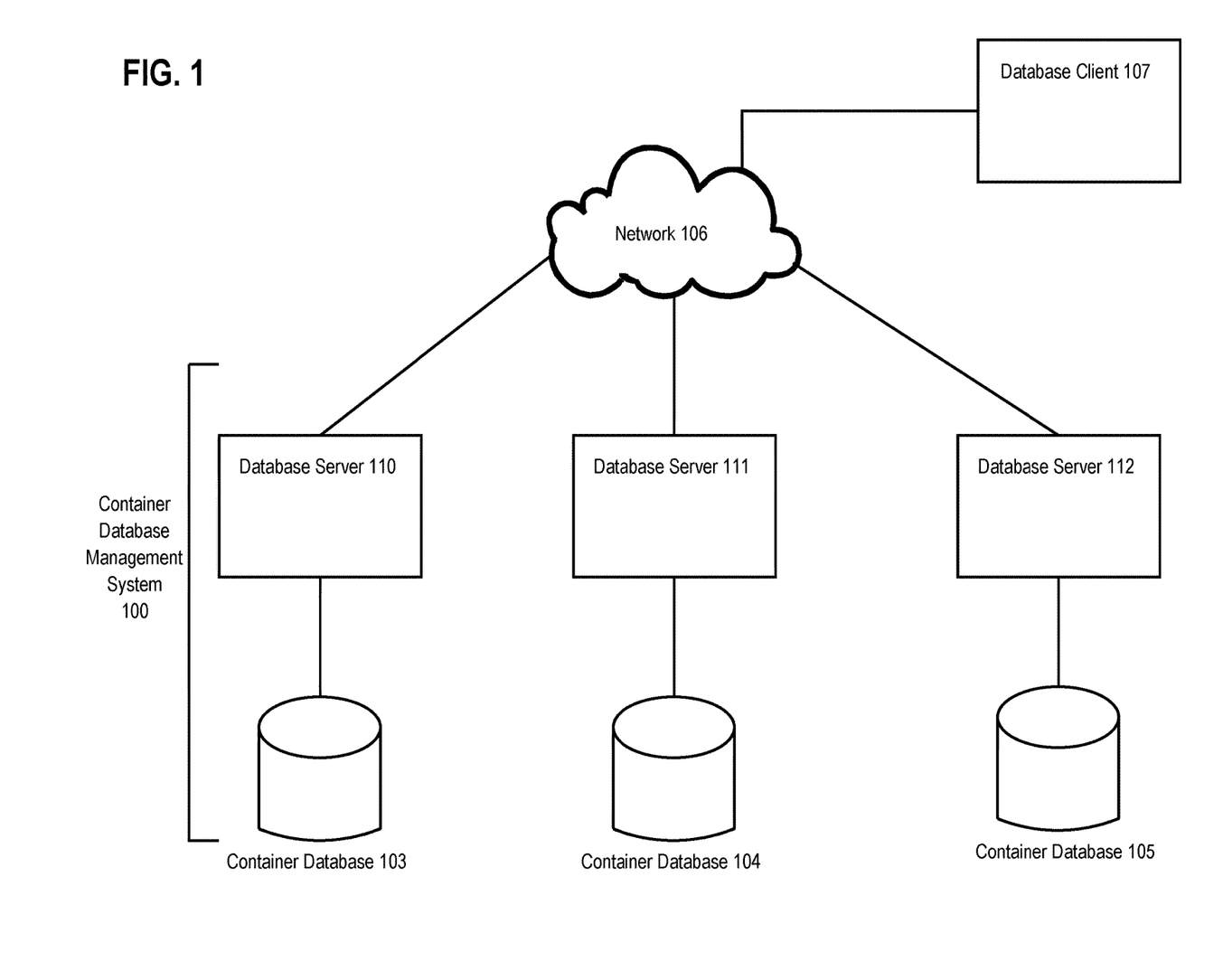
FIG. 1 illustrates an operating environment upon which an embodiment may be implemented.

FIG. 1 illustrates an example CDBMS that manages a CDB, upon which an embodiment may be implemented. Although FIG. 1 only depicts a particular number of each elements, a practical environment may have many more, perhaps hundreds or thousands, of each of the elements illustrated in FIG. 1.

In FIG. 1, CDBMS 100 comprises database server 110, database server 111, and database server 112 (collectively "the database servers") each represent a combination of software and resources on one or more computing devices that are communicatively coupled to their respective databases (container database 103, container database 104, and container database 105 respectively) and are communicatively coupled to each other via network 106 and also to database client 107. CDBMS 100 manages container database 103, container database 104, and container database 105, which are collectively referred to as "the container databases". An example of a computing device upon which the database servers may be implemented is described below in the "Hardware Overview". In some embodiments, the database servers are configured to accept user commands, such as queries, Data Definition Language (DDL), and Data Manipulation Language (DML) instructions, and carry out those commands on their respective container database. The container database and database servers comprise a CDBMS.

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the container databases. An example of a computing device upon which the database servers may be implemented is described below in the "Hardware Overview".

Container Database

Figure 2A:
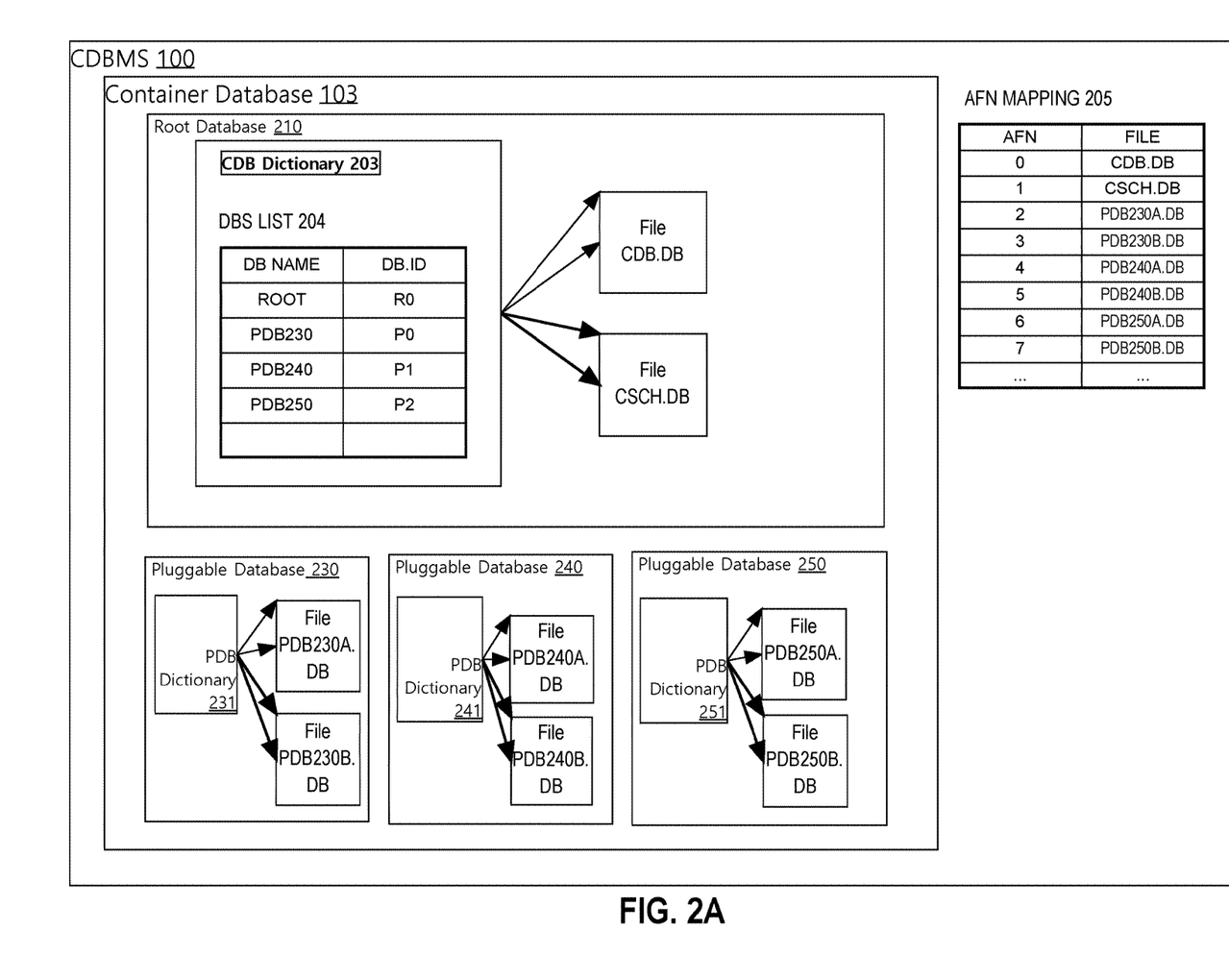
FIG. 2A illustrates an example structure of a container database according to an embodiment.

FIG. 2A illustrates an example structure for a general container database according to an embodiment. In order to illustrate clear examples, FIG. 2A is described with respect to container database 103, but the description is applicable to other container databases, such as container database 104 and container database 105 as well.

Container database 103 contains multiple databases that are hosted and managed by database server 110. The databases include root database 210, and PDB 230, PDB 240, PDB 250. In other embodiments, the container database 103 may contain more PDBs than the number of PDBs that are depicted in FIG. 2A. However, due to inherent hardware limitations, some implementations may set an upper limit on the number of PDBs that the container database 103 can support. Root database 210 is a database that is used by the database server 110 to globally manage container database 103, and to store metadata and/or data for "common database objects" that are accessible to users of the PDBs within the container database 103.

The database server 110 responsible for the container database 103 may establish database sessions to the root database 210, the PDB 230, or any of the member PDB. Database sessions to a PDB may be referred to as a PDB session. The database to which the database session connects determine the scope of the commands issued by the database client 107 (e.g. which database(s) the command will be executed on), which permissions are checked, which database dictionaries will be used for the session, and so forth.

Root database 210 is a database used by the database server 110 to globally manage the container database 103. An important function facilitated by root database 210 is to define PDBs within the container database 103. The database dictionary of the root database may be referred to herein as a root database dictionary. CDB dictionary 203 contains metadata that defines various aspects of the container database 103 needed to administer container database 103 and the PDBs contained therein.

Within CDB dictionary 203, DBS List 204 defines each database contained within container database 103, associating a database name and database ID for each. DBS List 204 defines: (1) root database 210, associating the database name ROOT and database ID R0 therewith, (2) PDB 230, with database name PDB 230 and P0, and so forth as depicted in FIG. 2A.

Each PDB 230, PDB 240, PDB 250 also includes a database dictionary. These include PDB dictionary 231, PDB dictionary 241, and PDB dictionary 251, respectively.

Database Files

Database data for database objects, such as tables, are stored in database files. The database dictionary of a database maps database objects of the database to database files that store data for the table. CDB dictionary 203 maps database objects of root database 210 to files CDB.DB and CSCH.DB. Similarly, PDB dictionary 231, PDB dictionary 241, PDB dictionary 251 map database objects of PDB 230 to files PDB230A.DB and PDB230B.DB, maps database of objects of PDB 240 to files PDB240A.DB and PDB240B.DB, and maps database objects of PDB 250 to files PDB250A.DB and PDB250B.DB, respectively.

Each database file of container database 103 is associated with an absolute file number (AFN). A AFN identifies a database file and is unique among other AFNs used within a container database. According to an embodiment, AFNs are mapped to database files in a one-to-one relationship, with the exception of a database file used to store a common schema, as shall be explained below.

Figure 2B:
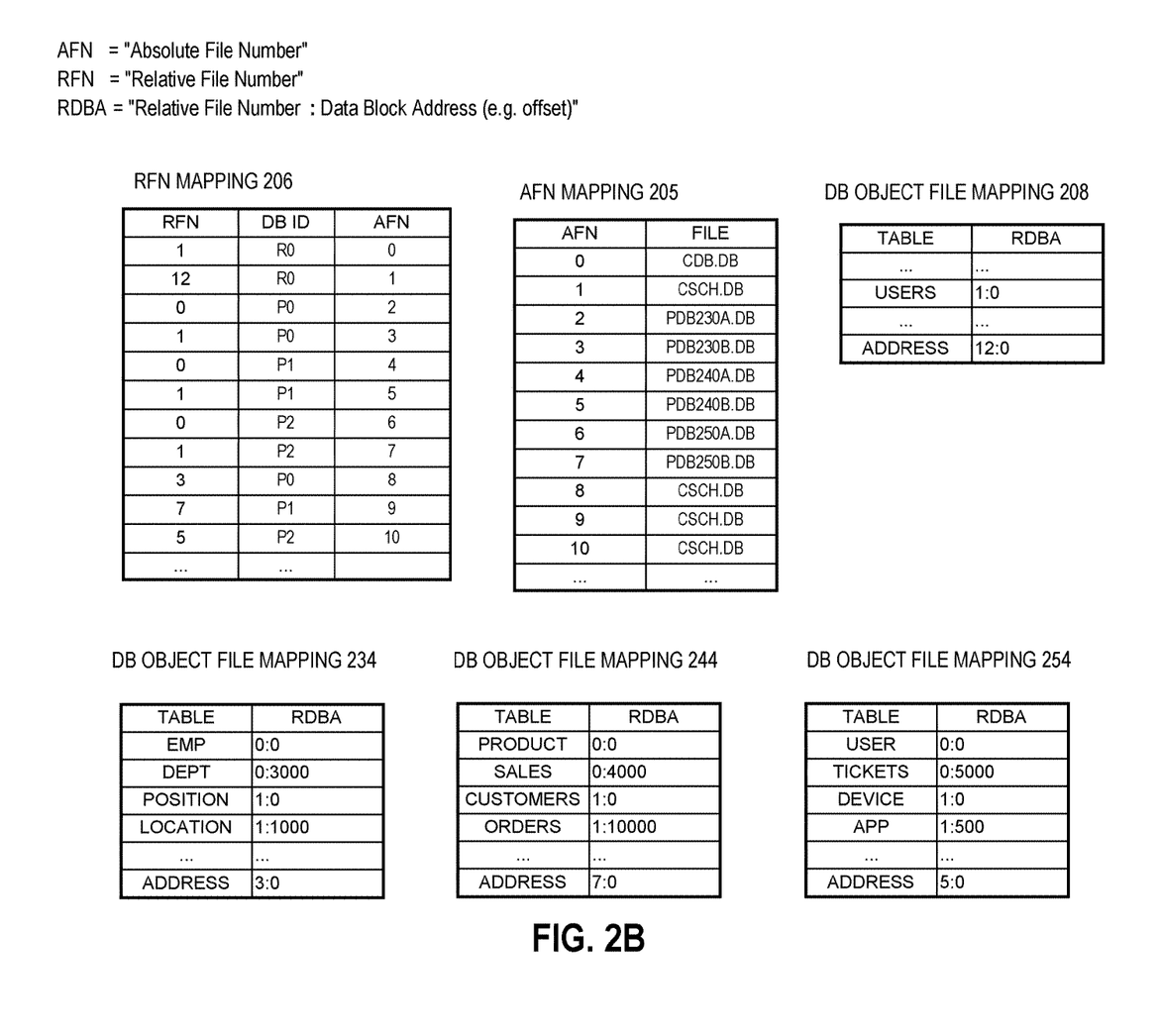
FIG. 2B illustrates examples of mapping database files within a database that include DB Object File mapping, RFN mapping, and AFN mapping, according to an embodiment of the present invention.

CDBMS 100 stores mapping AFN mapping 205, which is a mapping of AFNs to database files maintained by CDBMS 100 for any databases managed by CDBMS 100. AFN mapping 205 maps 0, 1, 2, 3, 4, 5, 6, 7 to CDB.DB, CSCH.DB, PDB230A.DB, PDB230B.DB, PDB240A.DB, PDB240B.DB, PDB250A.DB, and PDB250B.DB, respectively.

Mapping to Database Files within a Database

PDBs identify which database file a database object is stored in using a relative file number (RFN) rather than a AFN. In general, a set of RFNs are used to identify database files that belong to the PDB, or are otherwise accessible as part of the PDB. For each PDB within a container database, a set of RFNs is assigned to database files for the PDB. The sets of RFNs of respective PDBs of a container database may overlap. For example, the set of RFNs for one PDB may span the range of 1 to 500, and the set of RFNs for another PDB may span the range of 1 to 600.

As shall be explained in later in more detail, sets of RFNs are mapped to AFNs of database files. With the exception of database files for common schemas, no RFN of a PDB is mapped to the same database file as another RFN of the PDB within a container database. RFNs are in effect relative references to database files of the container database that store data for a particular PDB of the container database.

According to an embodiment, a root database also assigns RFNs to database files and uses the RFNs as relative reference database files.

Resolving a RFN to a database file entails resolving the RFN to a AFN and then resolving the AFN to a database file. To resolve a RFN to a AFN, a RFN mapping like RFN mapping 206 may be used. Referring to FIG. 2B, RFN mapping 206 maps a combination of RFN and database ID to a particular AFN. Once the combination has been resolved to a AFN, the AFN may be resolved to a database file using AFN mapping 205. In RFN mapping 206, there is in essence a one-to-one relationship between the set of RFNs of a PDB and the database files assigned to the set of RFNs.

In addition, data for a database object may not only be stored in a database file, but in a particular portion of the database file at a particular location within the database file. Data for different database objects may be stored at different locations with the same database file.

To map a database object to a particular location within a database file, a PDB dictionary and the root dictionary map the database object to an RDBA (Relative Data Block Address). For a database file storing data for a PDB, a RDBA comprises a RFN of the PDB assigned to the database file and Data Block Address (DBA) within a database file, such as an offset within a database file. Within the PDB dictionary of the PDB, a database object file mapping maps database objects to RDBAs.

Referring to FIG. 2B, it depicts DB Object File Mapping 234, DB Object File Mapping 244, DB Object File Mapping 254, and DB Object File Mapping 208, each of which are included in PDB dictionary 231, PDB dictionary 241, PDB dictionary 251, and CDB dictionary 203, respectively. Each of DB Object File Mapping 234, DB Object File Mapping 244, DB Object File Mapping 254, and DB Object File Mapping 208 maps the database objects to RDBAs.

For example, DB Object File Mapping 234 maps table EMP and DEPT to RDBA 0:0 and 0:3000, and table POSITION and LOCATION to RDBA 1:0 and 1:1000, respectively. DB Object File Mapping 244 maps table PRODUCT and SALES to RDBA 0:0 and 0:4000, respectively. Similarly, DB Object File Mapping 208 maps table USERS and ADDRESS to RDBA 1:0 and 12:0.

Resolving an RDBA to a location within a database file is illustrated using table ORDERs in PDB 240 by the following example. Through a PDB session established for PDB 240, a database statement is received referencing table ORDERS. An execution plan for the database statement includes a table scan for scanning data from the location within the database file storing data for table ORDERS. The DB Object file mapping maps table ORDERS to RDBA 1:10000, which includes RFN 1. RFN 1 is resolved to AFN 5 by determining that RFN 1 and the database ID of PDB 240, which is P1, resolves to AFN 5. AFN 5 resolves to database file PD240B.DB. The RDBA includes the address of 10000. Table scan for the data in ORDERS begins at DBA 10000 within database file PD240B.DB.

Mapping to Database Files that Store a Common Schema

According to an embodiment, common schemas are stored as database files that are each mapped to multiple AFNs. Such a database file is referred to herein as a common database file. According to an embodiment, a common database file is treated as a read-only database file, a status enforced not only at the DBMS level but also at the operating system level.

Each PDB dictionary includes a RFN that is mapped to one of the multiple AFNs. A AFN of a common database file to which a RFN of a PDB is mapped is referred to herein as a proxy AFN. A AFN that is mapped to a RFN of a root database is referred to as a principle AFN. In effect, a proxy AFN is a proxy for a principle AFN.

Referring to FIG. 2B, table ADDRESS is a common schema table that belongs to root database 210. Within the CDB dictionary 203, DB Object File Mapping 208 maps table ADDRESS to RDBA 12:0, which includes a RFN of 12. RFN Mapping 206 maps database RFN 12 and ID R0 of root database 210 to principle AFN 1, which is mapped by AFN Mapping 205 to CSCH.DB.

For PDB 230, within PDB dictionary 231 for table ADDRESS, DB Object File Mapping 234 maps table ADDRESS to RDBA 3:0, which includes a RFN of 3. RFN Mapping 206 maps database RFN 3 and database ID P0 of PDB 230 to proxy AFN 8, which is mapped by AFN Mapping 205 to CSCH.DB.

Resolving a RDBA to a common database file works in the same way as previously described. A difference for resolving common schemas is that multiple RFNs each resolve to a different proxy AFN, each of which can be resolved to the same common database file. Resolving an RDBA to a location within in a common database file is illustrated using common schema ADDRESS and a PDB session established for PDB 240. Through the PDB session established for PDB 240, a database statement is received referencing table ADDRESS. An execution plan for the database statement includes a table scan for scanning data from the location within the database file storing data for table ADDRESS. The DB Object file 244 mapping maps table ADDRESS to RDBA 7:0, which includes RFN 7. RFN 7 is resolved to AFN 9 by determining that RFN 7 and the database ID P1, the database ID of PDB 240, resolves to AFN 9. AFN 9 resolves to database file CSCH.DB. The RDBA includes the address of 0. Table scan for the data in ADDRESS begins at DBA 0 within database file CSCH.DB.

Resolving a RDBA for database statements referencing ADDRESS through PDB sessions to other PDBs works similarly. For a PDB session established for PDB 230, the RDBA for ADDRESS is 3:0, having RFN 3, which based on RFN Mapping 206, resolves to AFN 8 which based on AFN Mapping 205, resolves to common database file CSCH.DB.

Database Contexts and Switching

When a PDB session to PDB 230 executes a database statement that references ADDRESS, common schema table ADDRESS is accessed within the database context for PDB 230 ("PDB context"); no database context switch to the database context of root database 210 is needed. A database context is stored in a memory of a DBMS and includes attributes that are accessed by database processes executing within a database session. A database session has only one database context at any particular time that may be accessed by a database process of the database session. A database process of a database session executing a database statement while the database session has a database context is referred to herein as being executed within the database context; the database statement may also be referred to herein as being executed within the database context.

A database context has a variety of attributes. Among the attributes of a database context is the database ID and privileges for accessing database objects. Example database contexts are described in Oracle Database, Database Security Guide (No. E85682-04), 12c Release 2 (12.2), March 2019, the entire contents of which are incorporated herein by reference.

A database context for a database is needed in order to access the database dictionary for the database. Since a database context is needed to access a database's dictionary, a PDB session to a PDB, without an RDBA in the PDB dictionary that resolves to a AFN of a common database file, must use a database context switch to the root database context in order to obtain an RDBA that resolves to the common database file. However, for an embodiment of the present invention, because each PDB defines an RDBA for a common schema that can be resolved to a common database file, no database context switch is needed.

Execution Plans Show No Context Switching

An "execution plan" or "query execution plan", as the term is used herein, refers to a set of execution plan operations specified by a DBMS to execute a database statement. An execution plan operation is an operation that may be assigned to a database process for execution. Execution plan operations include, for example, an aggregation, a sort, a table scan, an index scan, hash-join, sort-merge join, nested-loop join, and filter. An execution plan may be represented by a tree (or a graph) of interlinked nodes, referred to herein as "plan operators" or "operators", each of which corresponds to a separate operation of an execution plan operation. The hierarchy of the tree represents the order in which the execution plan operations are performed and/or how data flows between each of the execution plan operations.

Many DBMSs provide a report that describes an execution plan generated for a particular database statement. Such a report is referred to herein as an "explain plan". A database context switch may also be an execution plan operation. Therefore, when a database context is needed to access a common schema table for an execution plan, the database context is described by the explain plan for the execution plan. According to an embodiment of the present invention, because no database context switch is needed to access a common schema when executing a database statement within a PDB session, the explain plan may include no context switch for accessing the common schema. In addition, the explain plan for a query on a data-linked object in a PDB shows the database context switch, but may not show the details of the execution plan of the underlying operation performed to retrieve the data in the root database during the context switch. For example, the explain plan may not show that an index is used for an operation performed within a root database context to access the common schema during a database context switch. However, according to novel techniques described herein, there is no database context switch, and therefore, the explain plan shows all the operations that of execution plan for accessing a common schema, including the use of indexes.

Application Root

Figure 2C:
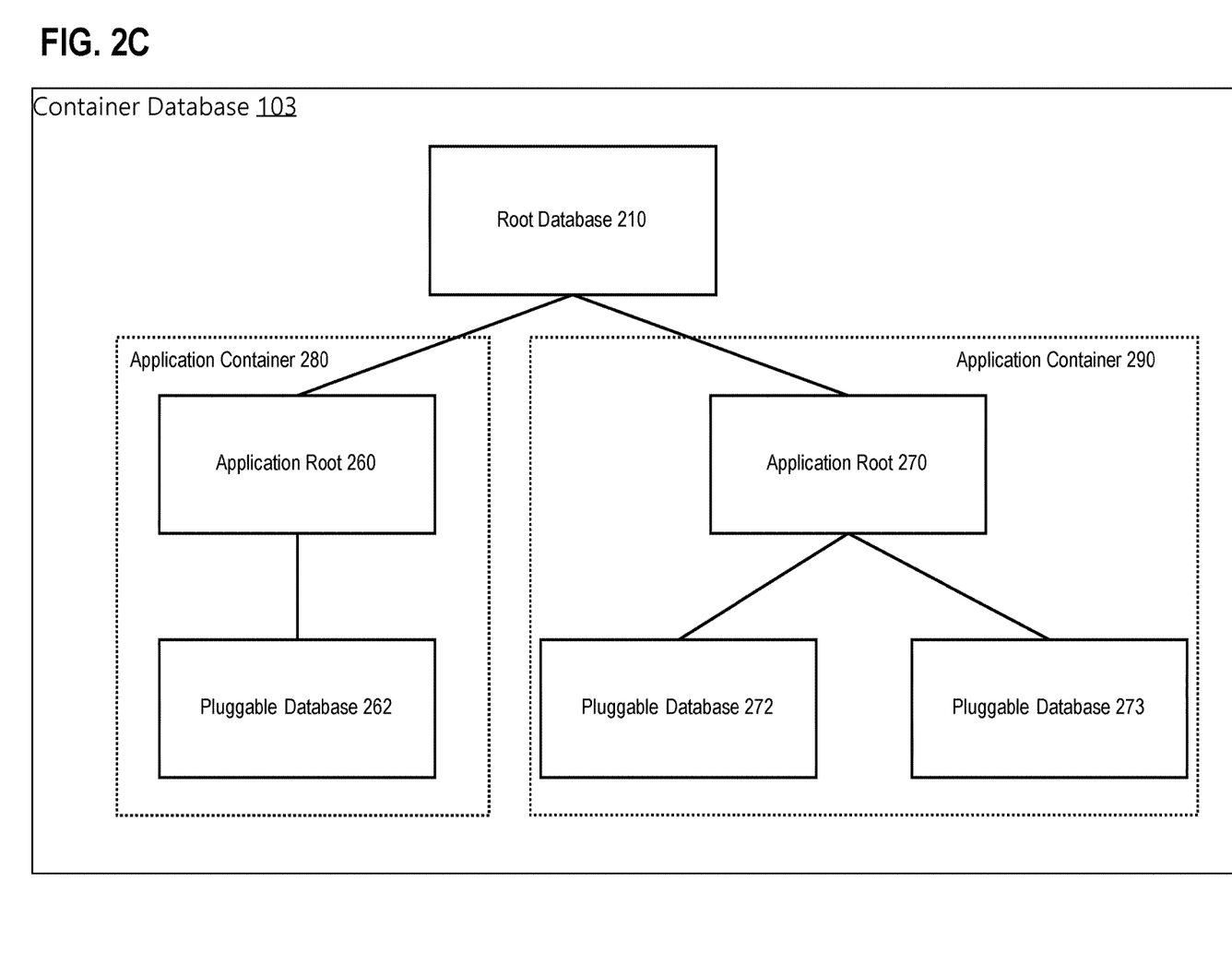
FIG. 2C illustrates an example logical hierarchy of a root databases, application roots, and PDBs according to an embodiment.

According to an embodiment, a PDB can in effect serves as a root database for a subset of PDBs in a container database. Such a PDB, herein referred to as an application root, that stores data and metadata that is shared among its member PDBs. Within a CDB, the structure of the root database, application roots, and member PDBs of the application roots are logically laid out in a tree structure.

FIG. 2C illustrates an example tree structure which illustrates a CDB with two different application containers. Although FIG. 2C illustrates only two application containers, in practice a CDB can have arbitrarily any number of application containers. Furthermore, in other embodiments, the root database may also have member PDBs of its own which do not belong to an application container.

For further information regarding the application root see "Application Containers in Container Databases", by Andre Kruglikov, Kumar Rajamani, Thomas Baby, and Philip Yam, U.S. application Ser. No. 15/331,525, filed on Oct. 21, 2016, which is hereby incorporated by reference for all purposes as though fully stated herein.

According to an embodiment, a common schema is stored as metadata in a database file in a root database or an application root database. A PDB can be "plugged" into an application container and access common schemas in the application root. Metadata for accessing common schemas is added to a PDB dictionary of the PDB when the PDB is plugged into a container database. Such metadata includes data defining the common schema, such as table, column names, and data types of the columns. The metadata also includes an RDBA for accessing the common schema table.

The database dictionary for the application root contains similar metadata defining the common schema and its columns, and a RDBA for the common database file of the common schema. Based on RFN mapping like RFN mapping 206, the RDBA resolves to a principle AFN, while the RDBA in a PDB dictionary of PDB contained in the application root resolves to a proxy AFN.

Software Overview

Figure 3:
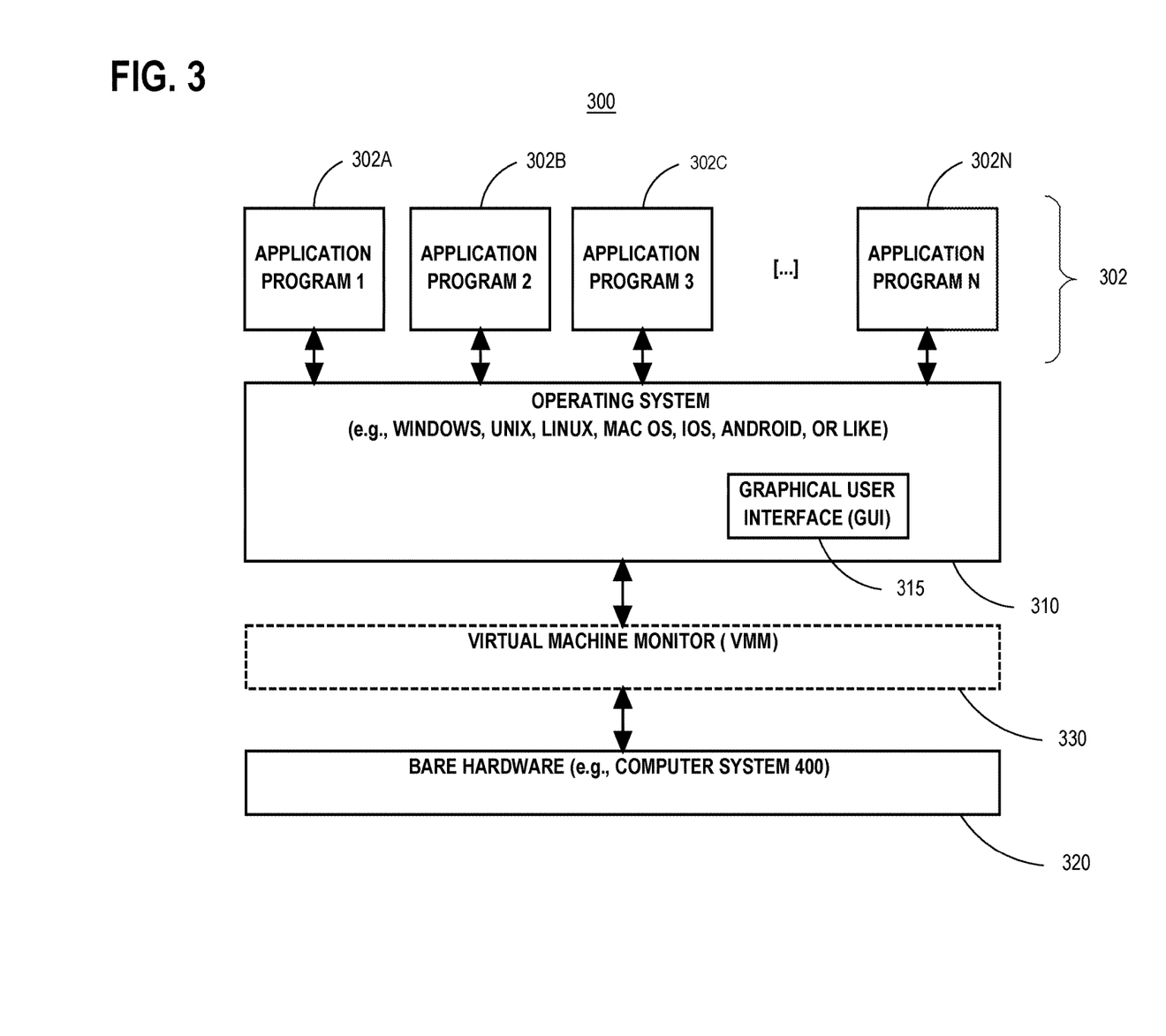
FIG. 3 is a block diagram of a basic software system 300 that may be employed for controlling the operation of computing system 400 according to an embodiment.
Figure 4:
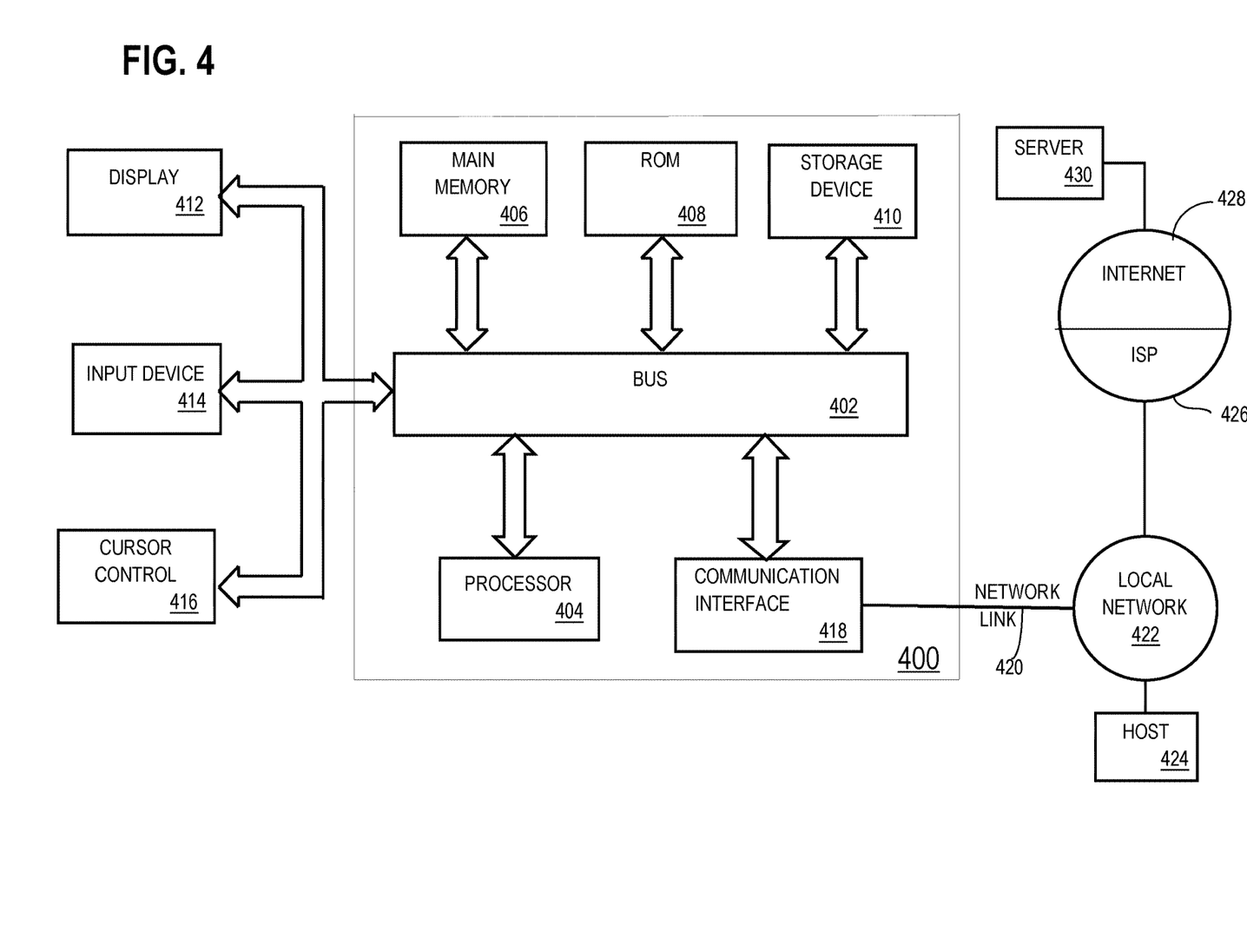
FIG. 4 is a block diagram that illustrates a computer system 400 upon which an embodiment of the invention may be implemented.

FIG. 3 is a block diagram of a basic software system 300 that may be employed for controlling the operation of computing system 400 of FIG. 4. Software system 300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (RAM) 306 and on fixed storage (e.g., hard disk or flash memory) 310, includes a kernel or operating system (OS) 310.

The OS 310 manages low-level aspects of computer operation, including managing execution of processes, memory allocation, file input and output (I/O), and device I/O. One or more application programs, represented as 302A, 302B, 302C . . . 302N, may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or other online service).

Software system 300 includes a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or application(s) 302. The GUI 315 also serves to display the results of operation from the OS 310 and application(s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
within a first pluggable database session, a container database management system ("CDBMS") receiving a first database statement from a database client that references a common schema table stored within a root database of a container database;
within a second pluggable database session, said CDBMS receiving a second database statement from a database client that references said common schema table;
wherein said CDBMS manages said container database, wherein said CDBMS contains a plurality of pluggable databases ("PDB") that include a first PDB and second PDB, wherein said first pluggable database session is attached to said first PDB and said second pluggable database session is attached to said second PDB;
wherein said CDBMS stores database data in a plurality of database files, wherein database data for each pluggable database of said plurality of pluggable databases is stored in a separate respective subset of PDB files that belong to said plurality of database files;
wherein said CDBMS maps a plurality of absolute file numbers ("AFNs") to said plurality of database files;
for each PDB of said plurality of PDBs, said CDBMS includes a respective plurality of relative file numbers ("RFNs") for said each PDB, wherein said respective plurality of RFNs overlap with a respective plurality of RFNs of at least one other PDB of said plurality of PDBs, wherein each PDB file of the respective subset of PDB files of said each PDB is mapped to a RFN of the respective plurality of RFNs of said each PDB and a distinct AFN of said plurality of AFNs;
wherein data for said common schema table is stored in a common database file, wherein said common schema table is mapped to a particular subset of AFNs comprising multiple proxy AFNs of said plurality of AFNs, said particular subset of AFNs comprising a first proxy AFN that is mapped to a first RFN of the respective plurality of RFNs of said first PDB and a second proxy AFN that is mapped to a second RFN of the respective plurality of RFNs of said second PDB, said second proxy AFN being different than said first proxy AFN;
executing the first database statement, wherein executing the first database statement includes resolving the first RFN to said first proxy AFN and resolving said first proxy AFN to said common database file; and
executing the second database statement, wherein executing the second database statement includes resolving the second RFN to said second proxy AFN and resolving said second proxy AFN to said common database file.

2. The method of claim 1, wherein:
said CDBMS associates each PDB of said plurality of PDBs with a respective PDB ID of a plurality of a database IDs,
said CDBMS stores a particular mapping that, for each PDB of said plurality of PDBs, maps the respective PDB ID of said PDB and a RFN of the respective plurality of RFNs of said each PDB to an AFN of said plurality of AFNs;
wherein resolving the first RFN to said first proxy AFN includes using the particular mapping to resolve the first RFN to said first proxy AFN; and
wherein resolving the second RFN to said second proxy AFN includes using the particular mapping to resolve the second RFN to said second proxy AFN.

3. The method of claim 2, wherein said CDBMS includes a particular plurality of RFNs for said root database, wherein said particular plurality of RFNs overlap with a respective plurality of RFNs of at least one PDB of said plurality of PDBs, wherein said common database file is mapped to a particular RFN of said particular plurality of RFNs, wherein said root database is mapped to a particular database ID of said plurality of database IDs, wherein said particular mapping maps the particular database ID of said root database and the particular RFN to a particular AFN of said plurality of AFNs, wherein said particular AFN is different than said first proxy AFN and said second proxy AFN.

4. The method of claim 1, wherein executing the first database statement includes accessing the common database file within a database context for the first PDB.

5. The method of claim 4, wherein said first PDB includes a first PDB dictionary and said second PDB includes a second PDB dictionary, wherein each of said first PDB dictionary and second PDB dictionary define columns of said common schema table.

6. The method of claim 5, wherein executing said first database statement includes compiling said first database statement by at least using the first PDB dictionary to resolve a column of said common schema table referenced by said first database statement.

7. The method of claim 6, wherein said root database includes a particular database dictionary that defines column of said common schema table.

8. The method of claim 1, wherein said common database file is a read-only file while said executing said first database statement and while executing said second database statement.

9. The method of claim 1, each respective subset of PDB files of each PDB of said plurality of PDB is mapped to only one AFN of said plurality of AFNs.

10. One or more non-transitory storage media storing one or more sequences of instructions that, when executed by one or more processors, cause:
within a first pluggable database session, a container database management system ("CDBMS") receiving a first database statement from a database client that references a common schema table stored within a root database of a container database;
within a second pluggable database session, said CDBMS receiving a second database statement from a database client that references said common schema table;
wherein said CDBMS manages said container database, wherein said CDBMS contains a plurality of pluggable databases ("PDB") that include a first PDB and second PDB, wherein said first pluggable database session is attached to said first PDB and said second pluggable database session is attached to said second PDB;
wherein said CDBMS stores database data in a plurality of database files, wherein database data for each pluggable database of said plurality of pluggable databases is stored in a separate respective subset of PDB files that belong to said plurality of database files;
wherein said CDBMS maps a plurality of absolute file numbers ("AFNs") to said plurality of database files;
for each PDB of said plurality of PDBs, said CDBMS includes a respective plurality of relative file numbers ("RFNs") for said each PDB, wherein said respective plurality of RFNs overlap with a respective plurality of RFNs of at least one other PDB of said plurality of PDBs, wherein each PDB file of the respective subset of PDB files of said each PDB is mapped to a RFN of the respective plurality of RFNs of said each PDB and a distinct AFN of said plurality of AFNs;

wherein data for said common schema table is stored in a common database file, wherein said common schema table is mapped to a particular subset of AFNs comprising multiple proxy AFNs of said plurality of AFNs, said particular subset of AFNs comprising a first proxy AFN that is mapped to a first RFN of the respective plurality of RFNs of said first PDB and a second proxy AFN that is mapped to a second RFN of the respective plurality of RFNs of said second PDB, said second proxy AFN being different than said first proxy AFN;

executing the first database statement, wherein executing the first database statement includes resolving the first RFN to said first proxy AFN and resolving said first proxy AFN to said common database file; and executing the second database statement, wherein executing the second database statement includes resolving the second RFN to said second proxy AFN and resolving said second proxy AFN to said common database file.

11. The one or more non-transitory storage media of claim 10, wherein:

said CDBMS associates each PDB of said plurality of PDBs with a respective PDB ID of a plurality of a database IDs, said CDBMS stores a particular mapping that, for each PDB of said plurality of PDBs, maps the respective PDB ID of said PDB and a RFN of the respective plurality of RFNs of said each PDB to an AFN of said plurality of AFNs;

wherein resolving the first RFN to said first proxy AFN includes using the particular mapping to resolve the first RFN to said first proxy AFN; and wherein resolving the second RFN to said second proxy AFN includes using the particular mapping to resolve the second RFN to said second proxy AFN.

12. The one or more non-transitory storage media of claim 11, wherein said CDBMS includes a particular plurality of RFNs for said root database, wherein said particular plurality of RFNs overlap with a respective plurality of RFNs of at least one PDB of said plurality of PDBs, wherein said common database file is mapped to a particular RFN of said particular plurality of RFNs, wherein said root database is mapped to a particular database ID of said plurality of database IDs, wherein said particular mapping maps the particular database ID of said root database and the particular RFN to a particular AFN of said plurality of AFNs, wherein said particular AFN is different than said first proxy AFN and said second proxy AFN.

13. The one or more non-transitory storage media of claim 10, wherein executing the first database statement includes accessing the common database file within a database context for the first PDB.

14. The one or more non-transitory storage media of claim 13, wherein said first PDB includes a first PDB dictionary and said second PDB includes a second PDB dictionary, wherein each of said first PDB dictionary and second PDB dictionary define columns of said common schema table.

15. The one or more non-transitory storage media of claim 14, wherein executing said first database statement includes compiling said first database statement by at least using the first PDB dictionary to resolve a column of said common schema table referenced by said first database statement.

16. The one or more non-transitory storage media of claim 15, wherein said root database includes a particular database dictionary that defines column of said common schema table.

17. The one or more non-transitory storage media of claim 10, wherein said common database file is a read-only file while said executing said first database statement and while executing said second database statement.

18. The one or more non-transitory storage media of claim 10, each respective subset of PDB files of each PDB of said plurality of PDB is mapped to only one AFN of said plurality of AFNs.

* * * * *